United States Patent
Knox et al.

(10) Patent No.: US 7,375,764 B2
(45) Date of Patent: May 20, 2008

(54) METHOD AND SYSTEM FOR VFC MEMORY MANAGEMENT

(75) Inventors: Michael Dwayne Knox, Fishers, IN (US); Guenter Anton Grimm, Deiblingen (DE)

(73) Assignee: Thomson Licensing, Boulogne, Billancourt (FR)

( * ) Notice: Subject to any disclaimer, the term of this patent is extended or adjusted under 35 U.S.C. 154(b) by 448 days.

(21) Appl. No.: 10/514,663

(22) PCT Filed: May 12, 2003

(86) PCT No.: PCT/US03/14766

§ 371 (c)(1),
(2), (4) Date: Nov. 16, 2004

(87) PCT Pub. No.: WO03/100551

PCT Pub. Date: Dec. 4, 2003

(65) Prior Publication Data

US 2005/0225673 A1 Oct. 13, 2005

Related U.S. Application Data

(60) Provisional application No. 60/381,414, filed on May 17, 2002.

(51) Int. Cl.
*H04N 7/01* (2006.01)
*H04N 11/20* (2006.01)
*H04N 9/64* (2006.01)

(52) U.S. Cl. .................. 348/458; 348/441; 348/443; 348/445; 348/459; 348/714; 348/716

(58) Field of Classification Search .......... 348/426.1, 348/427.1, 441, 443, 445, 458, 459
See application file for complete search history.

(56) References Cited

U.S. PATENT DOCUMENTS

| 5,822,008 A | 10/1998 | Inoue et al. |
| 5,889,562 A | 3/1999 | Pau |
| 6,388,711 B1 | 5/2002 | Han et al. |
| 6,667,773 B1* | 12/2003 | Han, II .................. 348/441 |
| 6,683,655 B2* | 1/2004 | Han, II .................. 348/581 |
| 6,836,294 B2* | 12/2004 | Miller et al. ........... 348/458 |
| 6,862,043 B1* | 3/2005 | Song ..................... 348/441 |

(Continued)

FOREIGN PATENT DOCUMENTS

WO   WO 01/28244   4/2001

(Continued)

OTHER PUBLICATIONS

Search Report Dated Sep. 19, 2003.

*Primary Examiner*—Brian P. Yenke
(74) *Attorney, Agent, or Firm*—Joseph J. Laks; Vincent E. Duffy

(57) ABSTRACT

A method for managing vertical format converter line memories includes writing a number of first input video lines into the VFC line memories, writing an additional video line into the VFC line memories, and reading respective pixels of the first input video lines and the additional input video line from the VFC line memories in parallel. The reading of respective pixels is commenced prior to completion of the writing of the additional video line. A digital video receiving system includes a somewhat similarly configured video processor.

15 Claims, 2 Drawing Sheets

U.S. PATENT DOCUMENTS

| | | | |
|---|---|---|---|
| 6,900,845 B1 * | 5/2005 | Christopher et al. | 348/445 |
| 7,006,147 B2 * | 2/2006 | Willis | 348/448 |
| 2001/0007477 A1 | 7/2001 | Han | |
| 2002/0008780 A1 | 1/2002 | Han | |
| 2002/0167476 A1 | 11/2002 | Willis | |

FOREIGN PATENT DOCUMENTS

| | | |
|---|---|---|
| WO | WO 02/30115 | 4/2002 |

* cited by examiner

METHOD AND SYSTEM FOR VFC MEMORY MANAGEMENT

This application claims the benefit, under 35 U.S.C. § 365 of International Application PCT/US03/14766, filed May 12, 2003, which was published in accordance with PCT Article 21(2) on Dec. 4, 2003 in English and which claims the benefit of U.S. Provisional Patent Application Ser. No. 60/381,414, filed May 17, 2002.

FIELD OF THE INVENTION

The present invention relates to processing video line data in a video processing system.

BACKGROUND OF THE INVENTION

A typical television broadcast station transmits video signals in standard resolution. When the video signals are received by a video signal receiver, the standard resolution is expanded if the resolution of the display associated with the video signal receiver is higher than the standard resolution, compressed if the resolution of the display is less than the standard resolution, or left unchanged if the resolution of the display is the same as the standard resolution. A conventional video signal receiver includes a main-channel format converter ("MFC") for expanding or compressing the resolution of the received video signal. The MFC includes a horizontal format converter ("HFC") for performing resolution conversion in the horizontal direction and a vertical format converter ("VFC") for performing resolution conversion in the vertical direction.

Typical VFC designs require line memories to store video lines for vertical resolution expansion or compression. In a through mode input and output formats are the same; so the VFC merely requires 1 new input line for every output line that it produces. But to perform a resolution compression, the VFC often needs to take in more than one input line to produce an output line. For example, in a ⅔ resolution compression the VFC uses 12 input lines to produce 8 output lines. Resolution compression may require the VFC to use varying numbers of input lines to produce a series of output lines. In the ⅔ resolution compression, for example, the conventional VFC toggles between 1 and 2 new input lines for every output line that it produces.

The optimum bandwidth for a given vertical resolution compression is approximately equal to the inverse of the resolution compression ratio times the bandwidth of the input lines. To continue the example, the optimum bandwidth for the ⅔ resolution compression is about 1.5 times the bandwidth of the input signal. However, in typical implementations the VFC will need significantly more than the optimum bandwidth. For the ⅔ resolution compression, typical implementations require 2 (or more) times the bandwidth of the input in order to meet the highest bandwidth peak for all output lines, which occurs if two input lines are written to the line memories during the time of one output line. The high bandwidth requirements strain available resources within integrated circuits ("ICs") that implement VFCs, driving up system clock speeds and/or memory bus sizes.

A significant contributor to the high bandwidth requirements of the typical VFC implementation is that generation of each output line is not started until after all of the respective input lines are fully stored in memory. Another drawback of typical VFC implementations is that new input lines (i.e., input lines needed to generate future output lines) are not written to the line memories until after the data for the present output line is fully read from the memories. Another drawback of typical VFC implementations is that processing is suspended during the vertical blanking interval. Such drawbacks fail to fully utilize the line memories for reduction of the overall VFC processing bandwidth.

The present invention is directed to overcoming the drawbacks discussed above.

SUMMARY OF THE INVENTION

A method for managing vertical format converter ("VFC") line memories (62) includes writing a number of first input video lines into the VFC line memories (62), writing an additional video line into the VFC line memories (62), and reading respective pixels of the first input video lines and the additional input video line from the VFC line memories (62) in parallel. The reading of respective pixels is commenced prior to completion of the writing of the additional video line.

A digital video receiving system (10) includes an antenna (20), an input processor (22) coupled to the antenna (20), a demodulator (24) coupled to the input processor (22), and a video processor (32) coupled to the demodulator (24). The video processor (32) includes vertical format converter ("VFC") line memories (62) and is configured to write a number of first input video lines into the VFC line memories (62), write an additional video line into the VFC line memories (62), and begin reading respective pixels of the first input video lines and the additional input video line from the VFC line memories (62) in parallel prior to a completion of the writing of the additional video line.

DETAILED DESCRIPTION OF THE PREFERRED EMBODIMENT

The characteristics and advantages of the present invention will become more apparent from the following description, given by way of example.

Figure 1:
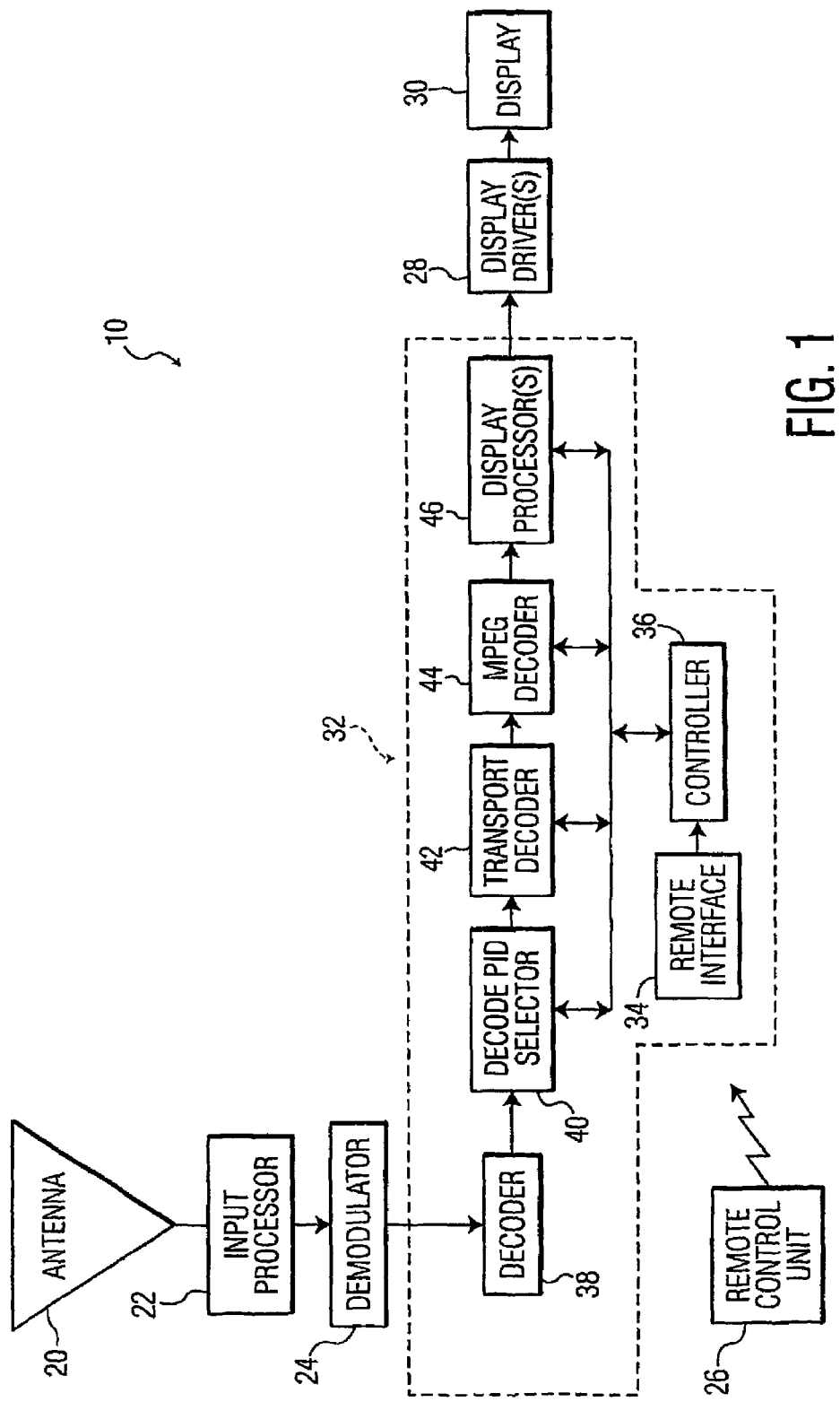
FIG. 1 is a block diagram of an exemplary digital video receiving system according to the present invention.

FIG. 1 is a block diagram of an exemplary digital video receiving system 10 according to the present invention. System 10 includes an antenna 20 and an input processor 22 for together receiving and digitizing a broadcast carrier modulated with signals carrying audio, video, and associated data. System 10 also includes a demodulator 24 for receiving and demodulating the digital output from input processor 22. Further, system 10 includes a remote control unit 26 for receiving user input commands. System 10 also includes one or more digital-input-to-digital-output or digital-input-to-analog-output display driver(s) 28 and a respective digital-input or analog-input display 30 for together converting digital video picture data into visual representations. In the preferred embodiment, display 30 is a high definition television ("HDTV") plasma display unit and, accordingly, display driver(s) 28 is a suitable digital-input-to-digital-output device.

System 10 further includes a video processor 32. In general, video processor 32 receives user input commands from remote control unit 26, receives the demodulated data from demodulator 24, and transforms the demodulated data into video picture data for display driver(s) 28 in accordance with the user input commands. Accordingly, video processor 32 includes a remote interface 34 and a controller 36. Remote interface 34 receives user input commands from remote control unit 26. Controller 36 interprets the input commands and appropriately controls settings for various components of processor 32 to carry out the commands (e.g., channel and/or on-screen display ("OSD") selections). Video processor 32 further includes a decoder 38 for receiving the demodulated data from demodulator 24 and outputting a digital signal that is trellis decoded, mapped into byte length data segments, de-interleaved, and Reed-Solomon error corrected. The corrected output data from decoder 38 is in the form of a Moving Picture Experts Group ("MPEG") standard compatible transport data stream containing program representative multiplexed audio, video, and data components.

Processor 32 further includes a decode packet identifier ("PID") selector 40 and a transport decoder 42. PID selector 40 identifies and routes selected packets in the transport stream from decoder 38 to transport decoder 42. Transport decoder 42 digitally demultiplexes the selected packets into audio data, video data, and other data for further processing by processor 32 as discussed in further detail below.

The transport stream provided to processor 32 comprises data packets containing program channel data, ancillary system timing information, and program specific information such as program content rating and program guide information. Using the program specific information, transport decoder 42 identifies and assembles individual data packets including the user selected program channel. Transport decoder 42 directs the ancillary information packets to controller 36 which parses, collates, and assembles the ancillary information into hierarchically arranged tables.

The system timing information contains a time reference indicator and associated correction data (e.g., a daylight savings time indicator and offset information adjusting for time drift, leap years, etc.). This timing information is sufficient for an internal decoder (e.g., MPEG decoder 44, discussed below) to convert the time reference indicator to a time clock (e.g., United States eastern standard time and date) for establishing a time of day and date of the future transmission of a program by the broadcaster of the program. The time clock is useable for initiating scheduled program processing functions such as program play, program recording, and program playback.

Meanwhile, the program specific information contains conditional access, network information, and identification and linking data enabling system 10 to tune to a desired channel and assemble data packets to form complete programs. The program specific information also contains ancillary program content rating information (e.g., an age based suitability rating), program guide information (e.g., an Electronic Program Guide ("EPG")) and descriptive text related to the broadcast programs as well as data supporting the identification and assembly of this ancillary information.

System 10 also includes an MPEG decoder 44. Transport decoder 42 provides MPEG compatible video, audio, and sub-picture streams to MPEG decoder 44. The video and audio streams contain compressed video and audio data representing the selected channel program content. The sub-picture data contains information associated with the channel program content such as rating information, program description information, and the like. MPEG decoder 44 decodes and decompresses the MPEG compatible packetized audio and video data from transport decoder 42 and derives decompressed program representative data therefrom.

MPEG decoder 44 also assembles, collates and interprets the sub-picture data from transport decoder 42 to produce formatted program guide data for output to an internal OSD module (not shown). The OSD module processes the sub-picture data and other information to generate pixel mapped data representing subtitling, control, and information menu displays including selectable menu options and other items for presentation on display 30. The control and information displays, including text and graphics produced by the OSD module, are generated in the form of overlay pixel map data under direction of controller 36. The overlay pixel map data from the OSD module is combined and synchronized with pixel representative data from decoder 38 under the direction of controller 36. Combined pixel map data representing a video program on the selected channel together with associated sub-picture data is encoded by MPEG decoder 44.

System 10 further includes one or more display processor(s) 46. In general, display processor(s) transform the encoded program and sub-picture data from MPEG decoder 44 into a form compatible with display driver(s) 28. In the exemplary embodiment, display processor(s) 46 include a VFC 60 (see FIG. 2) according to the present invention as discussed further below.

Figure 2:
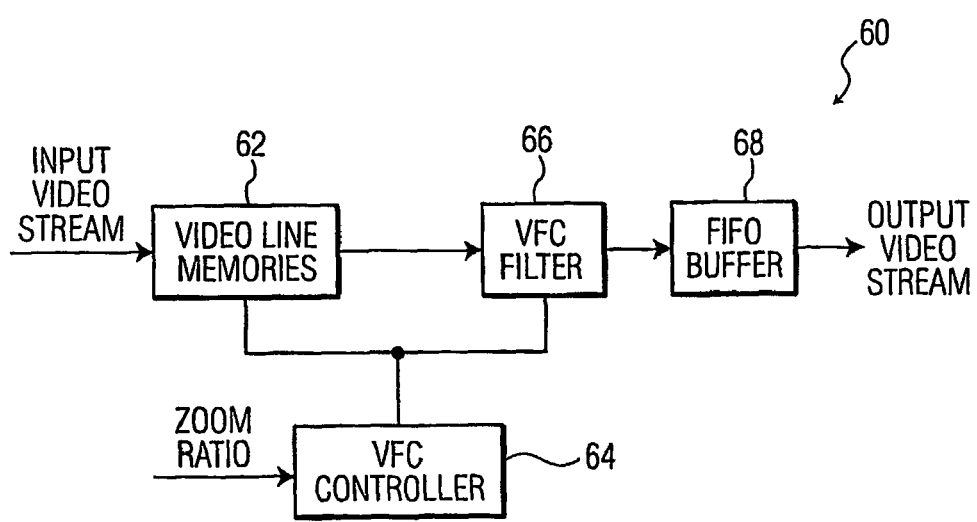
FIG. 2 is a block diagram of an exemplary VFC according to the present invention.

FIG. 2 is a block diagram of an exemplary VFC 60 according to the present invention. VFC 60 includes a plurality of parallel video line memories 62, a VFC controller 64, a VFC filter 66, and a first-in first-out ("FIFO") data buffer 68. In general, VFC controller 64 controls video line memories 62 and VFC filter 66 to store or queue data representing groups of incoming video lines and further to combine pixels of the lines to produce a respective desired output video stream that represents a compression (or expansion) of the input video stream according to the zoom ratio. Accordingly, it should be appreciated that video line memories 62 are configured in a known manner to store the incoming video lines in parallel (i.e., each line memory within video line memories 62 can hold one line of video data). To this end, the number of line memories included video line memories 62 is predetermined and fixed according to the desired processing quality. For example, in one exemplary embodiment suitable for processing typical luma (i.e., luminous intensity) pixel/line data, VFC line memories 62 includes 4 parallel line memories; while in another exemplary embodiment for processing chroma (i.e., color) pixel/line data, VFC line memories 62 includes 2 parallel line memories. Further, as known, VFC line memories 62 include a write control (not shown) that is configured to operate under the direction of VFC controller 64 to manage the writing of the input video stream into the line memories. It should also be appreciated that VFC filter 66 is configured in a known manner to combine respective (parallel) pixels of the stored video line data under the direction of VFC controller 64 to produce the desired output video stream. Accordingly, VFC filter 66 includes a read control (not shown) configured to operate under the direction of VFC controller 64 to manage the reading of the data from the line memories. It is noted that the operational speed or clock rate ("write clock rate") of the write control may differ from the operation speed or clock rate ("read clock rate") of the read control. In any event, VFC controller 64 is further configured to operate VFC 60 according to the memory management technique discussed further below.

It should be appreciated that the video data stream(s) produced by display processor(s) 46 (see FIG. 1) consist(s) of a series of frames. Each frame contains a series of lines, and each of the lines contains a plurality of pixels. Known detection circuitry (not shown) in display processor(s) 46 detects the vertical resolution of the incoming video stream, compares the detected vertical resolution to the predetermined vertical resolution of display 30, and transmits an appropriate "zoom factor" signal to VFC controller 64. The zoom factor is a compression (or expansion) ratio that may be expressed as follows:

zoom factor=(output line size/*VFC* clock frequency)/
(input line size/display clock frequency), where input line size=number of incoming lines per frame, and output line size=desired number of display lines per frame Thus, if the zoom factor is less than 1, compression of the video line data (i.e., at least sometimes more than one input line is used to produce an output line) is necessary; whereas, if the zoom factor is greater than 1, expansion of the video line data is necessary; and if the zoom factor is equal to 1, neither compression nor expansion of the line data is necessary.

In the exemplary embodiment, VFC controller 64 is configured to cause video line memories 62 and VFC filter 66 to generate an output video stream comprised of a suitable respective pixel by pixel combination of stored video lines according to the following exemplary memory management technique of the present invention:

1. As VFC controller 64 causes VFC filter 66 to read VFC line memories 62 in parallel for generation of the present output video line, $L_n$, VFC controller 64 detects the number of new input video lines needed for generation of the next output video line, $L_{(n+1)}$;
2. VFC controller 64 causes VFC filter 66 to begin reading parallel pixel data for and generation of $L_n$ after VFC controller 64 causes VFC line memories 62 to write the first pixel of the last input line (and all pixels of the previous lines) needed for generation of $L_n$ (without waiting until the last input line is fully written into memory);
3. VFC controller 64 causes VFC line memories 62 to go ahead and write (store) new (next) input lines need for generation of $L_{(n+1)}$ into any available line memories after all input lines needed for generation of $L_n$ have been written to the line memories (without waiting until VFC filter 66 has read all data for the generation of $L_n$ from the line memories); and
4. VFC controller 64 provides pixel overwrite protection (which temporarily suspends writing or reading as necessary to prevent data losses) when the read and write clocks are not the same.

Additionally, it should be appreciated that for video line compressions, the write clock rate must be equal to or greater than the read clock rate.

FIFO buffer 68 receives the output data stream from VFC filter 66 and forwards the data to downstream processors within display processor(s) 46 or forwards it directly to display driver(s) 28. In any event, FIFO buffer 68 allows VFC 60 to continue processing video data as discussed above when downstream devices are too busy or temporarily suspended from receiving the output video stream (such as, for example, during the vertical blanking interval).

Thus, the present invention increases video line memory usage by reading and writing line memories more continuously, which evens and reduces bandwidth requirements during resolution compression or expansion.

While the present invention has been described with reference to the preferred embodiments, it is apparent that various changes may be made in the embodiments without departing from the spirit and the scope of the invention, as defined by the appended claims.

The invention claimed is:

1. A method for managing vertical format converter ("VFC") line memories, the method comprising the steps of:
    writing a number of first input video lines into the VFC line memories;
    writing an additional video line into the VFC line memories; and
    reading respective pixels of the first input video lines and the additional input video line from the VFC line memories in parallel;
    wherein the step of reading respective pixels is commenced prior to completion of the step of writing the additional video line.

2. The method of claim 1, further comprising the steps of:
    concurrently with the step of reading the respective pixels, receiving an indication of a number of new input video lines to write into the VFC line memories; and
    writing at least one of the new input video lines into the VFC line memories;
    wherein the step of writing at least one of the new input video lines is commenced prior to completion of the step of reading respective pixels.

3. The method of claim 2, wherein all of the steps are completed during a vertical blanking interval.

4. The method of claim 2, wherein the additional video line includes a first pixel and a third pixel, the step of reading respective pixels is commenced after writing the first pixel of the additional video line into the VFC line memories, and the step of reading respective pixels is commenced before writing the third pixel of the additional video line into the VFC line memories.

5. The method of claim 4, wherein the step of writing a number of first input video lines is limited to writing less than four input video lines.

6. A apparatus for managing vertical format converter ("VFC") line memories, the apparatus comprising:
    a means for writing a number of first input video lines into the VFC line memories and for writing an additional video line into the VFC line memories; and
    a means for reading respective pixels of the first input video lines and the additional input video line from the VFC line memories in parallel;
    wherein the means for reading respective pixels is coupled to the means for writing the additional video line, and at least one of the means for reading respective pixels and the means for writing the additional video line is configured to commence reading the respective pixels prior to a completion of the writing of the additional video line.

7. The apparatus of claim 6, further comprising:
    a means for receiving, concurrently with reading the respective pixels, an indication of a number of new input video lines to write into the VFC line memories;
    wherein the means for receiving the indication is coupled to at least one of the means for reading respective pixels and the means for writing an additional video line, and the writing means includes a means for writing at least one of the new input video lines into the VFC line memories prior to a completion of the reading of the respective pixels.

8. The apparatus of claim 7, further comprising:
a means for facilitating operations during a vertical blanking interval.

9. A digital video receiving system, comprising:
an antenna;
an input processor coupled to the antenna;
a demodulator coupled to the input processor; and
a video processor coupled to the demodulator, the video processor including vertical format converter ("VFC") line memories and being configured to
write a number of first input video lines into the VFC line memories,
write an additional video line into the VFC line memories, and
begin reading respective pixels of the first input video lines and the additional input video line from the VFC line memories in parallel prior to a completion of the writing of the additional video line.

10. The digital video receiving system of claim 9, wherein the video processor is further configured to
concurrently with reading the respective pixels, generate an indication of a number of new input video lines to write into the VFC line memories, and
commence writing at least one of the new input video lines into the VFC line memories prior to a completion of the reading of the respective pixels.

11. The digital video receiving system of claim 10, wherein the video processor further includes a VFC filter coupled to the VFC line memories, and further includes a FIFO buffer coupled to the VFC filter.

12. The digital video receiving system of claim 10, wherein the video processor is further configured to
commence reading the respective pixels after writing a first pixel of the additional video line into the VFC line memories, and
commence reading the respective pixels before writing a third pixel of the additional video line into the VFC line memories.

13. The digital video receiving system of claim 12, wherein the video processor includes an MPEG decoder.

14. The digital video receiving system of claim 13, further comprising:
at least one display driver coupled to the video processor; and
a display coupled to the display driver.

15. The digital video receiving system of claim 14, wherein the display includes a high definition television plasma display unit.

* * * * *